Sept. 13, 1960 C. P. FORTNER 2,952,034
BLOW MOLDING MACHINE AND PROCESS
Filed April 18, 1956 2 Sheets-Sheet 1
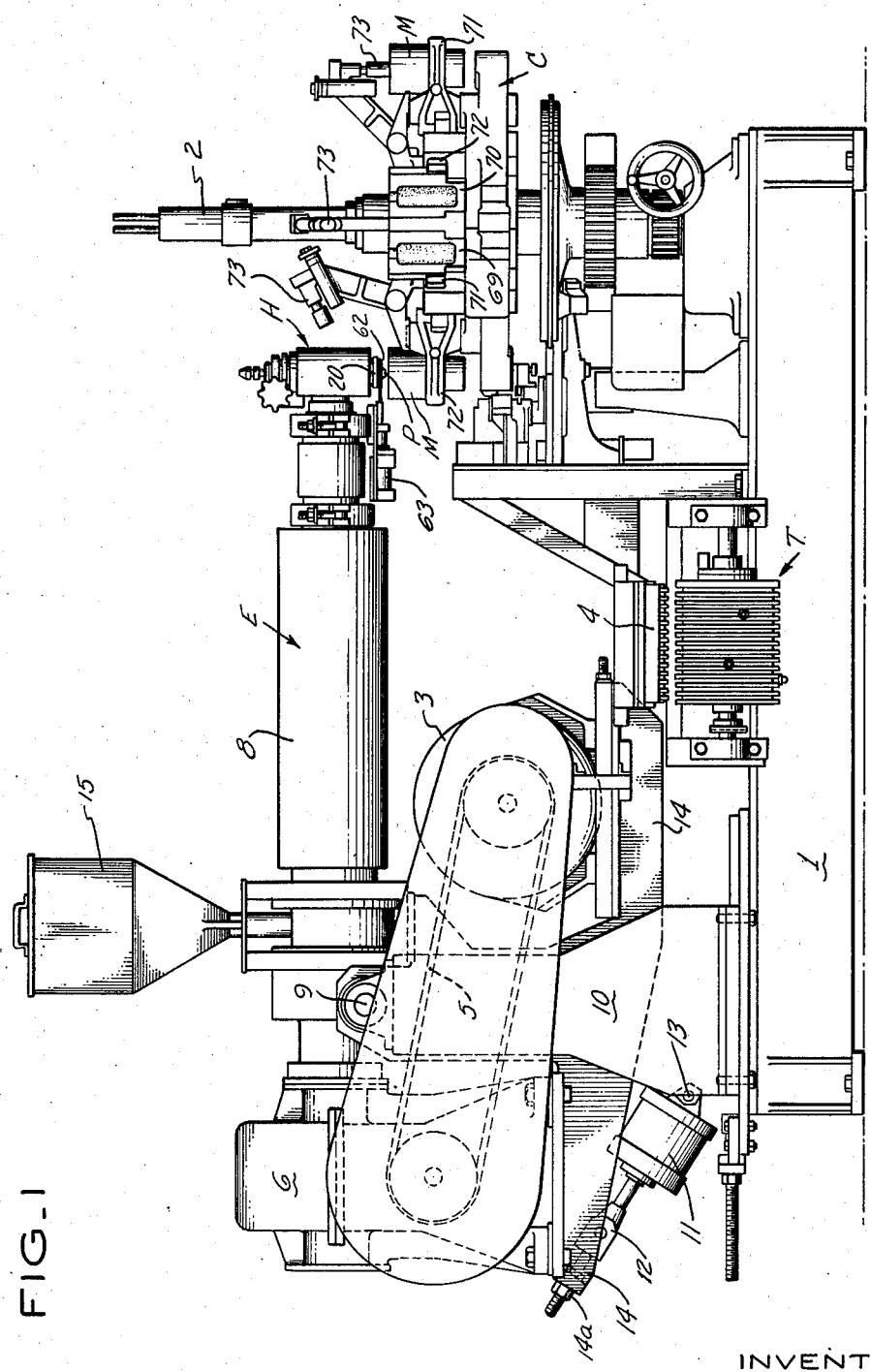
FIG_1
INVENTOR
C. P. FORTNER
BY Bates + Willard
ATTORNEYS Sept. 13, 1960     C. P. FORTNER     2,952,034
BLOW MOLDING MACHINE AND PROCESS
Filed April 18, 1956     2 Sheets-Sheet 2
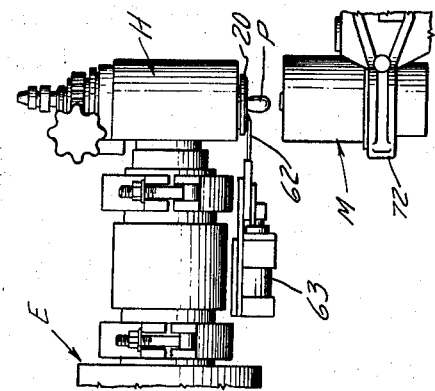
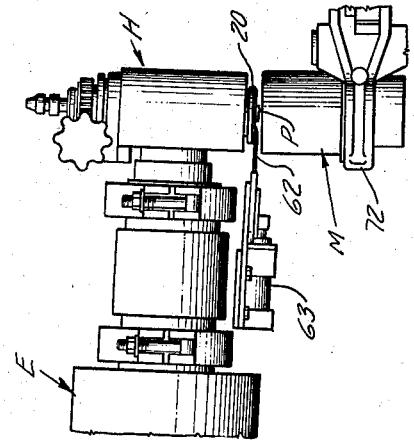
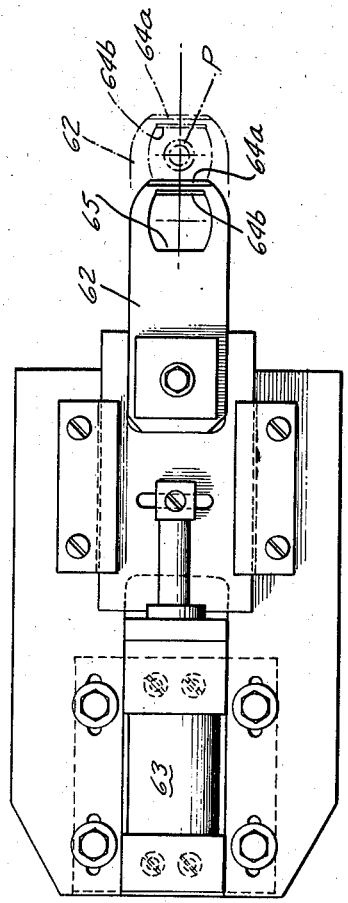
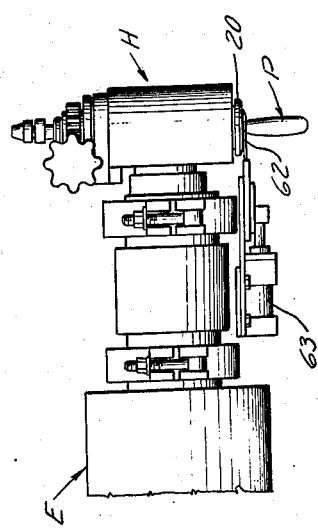
INVENTOR
C. P. FORTNER
BY Bates + Willard
ATTORNEYS United States Patent Office 2,952,034
Patented Sept. 13, 1960

2,952,034
BLOW MOLDING MACHINE AND PROCESS

Cecil Paul Fortner, Bloomfield, Conn., assignor to Plax Corporation, Bloomfield, Conn., a corporation of Delaware Filed Apr. 18, 1956, Ser. No. 579,016

2 Claims. (Cl. 18—5)

This invention relates to machines for extruding and blow molding plastic materials and has for its general object the provision of a new and improved machine in which the plastic for successive blown articles is continuously extruded and intermittently supplied to blow molding apparatus.

Heretofore machines for extruding and blow molding plastic materials have included means for plasticating molding powder under heat and substantial working pressure and for thereupon extruding or otherwise discharging the plastic material under pressure in the form of a tube. Thereafter, a length of the tube is blow molded within one or more molds into one or more bottles, or other blown articles, in an integrated process in which rigidification of the plastic is effected while the articles are maintained fully expanded and formed in the blow molds.

In accordance with the present invention, improved means are provided for continuously extruding the plastic in tubular form and for intermittently blow molding successive portions of the tubular discharge. The invention also provides a machine of the type indicated in which surging and uneven discharge of plastic is substantially avoided and in which the continuous pressure of plastication is uninterrupted despite intermittency of the blow molding operations.

Other objects and advantages of the invention will be pointed out or will be apparent from the following description, having reference to the accompanying drawing, in which:

Figure 1 is an elevation view of plasticating, extruding and blow molding apparatus embodying the invention:

Figs. 2–4 are enlarged views of the front portion of the extruding apparatus shown in Fig. 1 and showing successive positions of the extruder relative to the blow molding apparatus in accordance with the present invention; and Fig. 5 is an enlarged bottom plan view of the shear mechanism shown in Figs. 1–4.

Referring to the drawings, there is shown an extruder, generally designated E, having a head H through which plastic material P is extruded continuously and preferably in tubular shape. In accordance with the invention, successive lengths of the tubular plastic extrusion P are intermittently delivered to each of a plurality of molds M operably mounted on a rotary mold carrier which is generally designated C and which may be rotated continuously or step-by-step as by means of a Geneva drive or other suitable mechanism (not shown). There is provided a timer T having valves 4 which control the delivery of air or other fluid for blow molding the extruded plastic material and for timing and coordinating the operations of the several components of the machine, including the extruder E, the molds M, and the mold carrier C.

The illustrated machine includes a base 1 on which the extruder E is pivotally mounted and which, as shown in Fig. 1, also provides a platform upon which the rotary mold carrier C is mounted for rotation about a vertical column 2.

More particularly, the illustrated extruder E includes an elongate generally tubular casing 8 which is pivotally mounted adjacent its rear end portion on horizontal trunnion pins 9 which are journaled in brackets 10 secured to the base 1 and provide for up-and-down pivotal movement of the forward or head portion H of the extruder. The pivotal movement is effected by a fluid motor 11 the housing of which is pivotally secured at 13 to the brackets 10 and the piston rod 12 of which is secured as by the nut 14a to a bracket 14 which depends from the rear end of the extruder E. The motor 11 is operated by hydraulic pressure medium which is supplied at intervals from the timer T to raise and lower the extruder head H. Downward movement of the head H may be cushioned by a compression spring (not shown) or by controlled bleeding of pressure medium from the motor 11, or by other suitable cushioning means.

The extrusion unit E includes a hopper 15 from which plastic molding powder is fed continuously into and through the heated barrel 8 of the extruder by a feed screw (not shown) which is continuously rotated in the barrel 8 by an electric motor 3.

As shown in Fig. 1, the motor 3 is mounted on the bracket 14 for pivotal movement with the extruder E and continuously drives the extruder screw through a speed reducer which is generally designated 6 and a guarded belt drive 5.

It will be understood that the heretofore described extruder mechanism is illustrative of plasticating and pressure applying units in general which are suitable for conditioning plastic material for extrusion and for continuously effecting extrusion of the material. The plastic molding powder supplied from the hopper 15 is plasticated by work and heat as it is continuously forced through the extruder by the screw in the barrel 8.

Generally it will not be necessary to provide a pressure regulating accumulator or other means to assure that the plastic which is continuously discharged by the extruder from the extrusion head H is maintained at a preselected substantially constant pressure. However, such a pressure regulator may be provided if desired to assure a uniform or other desired continuous flow pattern.

The head H receives the plastic material which has been heated and worked to the desired condition of plasticity as a result of its passage through the cylinder 8 and, as heretofore indicated, continuously and uninterruptedly discharges the softened plastic in tubular form from an extrusion nozzle 20 to the molds M.

In the illustrated embodiment of the invention, four of the molds M are provided on the carrier C and each is successively positioned beneath the extrusion nozzle 20 by the carrier C where each receives a length of the continuously extruded tubular plastic P.

The required lengths are severed from the plastic which issues in tubular shape from the die 20 by means of a knife 62 which, as shown in Figs. 2–5, is provided with an air motor 63 for reciprocating the knife and thereby shearing off all the plastic below the bottom of the nozzle 20 at regular intervals.

As shown in Fig. 5, the knife 62 includes a double-edged blade 64, the two edges 64a and 64b of which are located forward of an opening or aperture 65 through which the plastic tubing P may freely pass. Severance of the tubing P is effected alternately by the blade edges 64a and 64b. More particularly, when a required length of plastic has been extruded from the nozzle 20, the motor 63 is timer-actuated to either advance or retract the knife 62. If, for example, the last preceding actuation advanced the knife to the position shown in phantom in Fig. 5, the forward blade edge 64a effected the cut. Thereafter, the continuously extruded plastic P descends through the aperture 65 until a required length has been extruded whereupon the knife 62 is retracted by the motor 63 to the position shown in full in Fig. 5 and the length of tubing is severed by the rear blade edge 64b while the plastic P continues to issue but forward of the blade 64 preparatory to being next severed by the front blade edge 64a.

Preferably in accordance with the present invention, each shearing operation of the knife 62 is effected simultaneously with the raising of the extruder head H and nozzle 20 relative to the mold M by the tilt motor 11. Moreover, the movement of the head H preferably is at least slightly more rapid than the rate of extrusion of the plastic P from the nozzle 20 so that the severed ends of the plastic are drawn out of contact and the leading end of the extruding plastic P is not engaged while the carrier operates to replace with a new mold M the mold last charged with a length of plastic tubing P.

Moreover, the head H is raised high enough as shown in Fig. 2 and at a sufficient rate of travel relative to the elevation of the molds so that the mold M which is about to receive a charge is movable to the mold charging position under the nozzle 20 without contacting the plastic P.

Thereafter, the head H is moved to a position adjacent the mold, as shown in Fig. 3, by actuation of the tilt motor 11. When the required length of plastic P has been extruded between the halves 69 and 70 of the mold M which is open therebeneath, the mold halves are closed by operating arms 71 and 72, or the like, responsive to the timer. Substantially simultaneously, severance of the plastic P is effected by operation of the knife 62 responsive to the motor 63 and the head H is raised by the motor 11. Extrusion of the plastic P continues uninterruptedly, as indicated in Figs. 1 and 4, while a blow head 73 associated with each mold M on the carrier automatically moves into blowing position relative to its associated mold and the severed tubular plastic charge therein.

Blowing air or other suitable pressure fluid is admitted to and discharged from the blow head 73 into the tubular plastic charge in the mold. The blowing medium may be supplied in various ways. It may for example be supplied at high or low pressure.

It will be understood that the various molds M are located successively at the extruding and blowing positions and opened and closed when necessary as the carrier C advances.

A complete molding cycle of the illustrated machine involves a full revolution of the mold carrier C, and for each quarter turn of the carrier the extruder E and associated parts go through a complete cycle of operation in cooperative relation with one of the molds M on the carrier. The drum of the timer T turns four full revolutions during a single mold cycle.

The operation of the entire machine will be understood from the preceding description and from the following summary of operation.

The various parts of the machine are shown in Fig. 1 in the positions which they occupy when the mold carrier C is moving a charged mold M out from axial alignment beneath the extrusion nozzle 20 of the extruder head H which is being raised while a new length of plastic tubing P continues to extrude from the nozzle 20.

The charged mold is advanced by a 90° rotation of the carrier C and the following open mold from which a blown bottle or other article has been ejected moves into position beneath the extrusion nozzle 20 with the two mold halves 69 and 70 open to receive the tubular plastic charge P.

Thereupon, the motor 11 is timer actuated to tilt the extruder E and lower the head H to the position shown in Fig. 3 as the mold moves into alignment with the nozzle 20. Simultaneously the mold halves 69 and 70 close on the charge P and the knife 62 is actuated to sever the charge responsive to the timer. Immediately the motor 11 is reversed and the extruder head H raised so as to move the new charge P which continues to extrude from the nozzle 20 out of interfering relation with the molds to the position shown in Fig. 4 as the carrier C moves the charged mold out of alignment with the head H and the following mold into charging position.

While the carrier C may provide a momentary dwell of each mold M in alignment with the head, it normally is satisfactory to rotate the carrier C continuously and to effect the mold closing, charge severance, and nozzle raising operations on the fly, and may be effected with or without acceleration and deceleration of the carrier movement.

Raising and lowering of each blow head 73 into and out of blowing position on its mold M is of course effected after the head H has been raised from the mold.

Blowing air may be supplied initially to the plastic charge in the mold by the blow head 73, or the initial blowing may be effected by air introduced into the charge through the nozzle 20 immediately prior to severance by the knife 62 and the blow head 73 subsequently employed to reestablish and maintain blowing pressure until the blown article acquires a permanent set in the mold substantially as described in U.S. Patents 2,349,176 and 2,349,177, over which the present invention is an improvement.

While the illustrated embodiment introduces blowing air at the top of the molds, the invention also contemplates blowing from the bottom. In either case, the tubular charge P preferably is closed by pinching, as between the mold halves 69 and 70, as taught in U.S. Patent 2,349,177.

Various changes of course may be made in the details of construction and mode of operation of the illustrated embodiment of the invention without departing from the scope of the appended claims.

Generally, the invention contemplates use with organic plastic materials capable of being softened by heat and pressure and of being maintained at a low viscosity by transfer of heat thereto through metal walls without permanently or objectionably sticking to the metal surfaces so that the material may be delivered in heat-softened workable condition, shaped into an article and rigidified. Various organic plastic materials, including polyethylene, meeting the above requirements may be formed into hollow articles of various shapes by the machine of this invention. Such materials may be supplied to the hopper of the machine in a solid state and it is intended that the plastic materials be so delivered to the machine although some materials at least may be delivered to the machine in pre-softened condition.

While the illustrative embodiment has been shown with a carrier C which moves the molds in a plane generally at right angles to the direction of extrusion, the invention is not restricted thereto, and contemplates that the molds may travel in any desired path to and from the charging position which does not interfere with the continuous extrusion of the plastic and the coordinated movement of the extrusion head H to and from the charging position.

I claim:

1. A method for making plastic hollow ware in apparatus including a movably mounted extruder nozzle and means for uninterruptedly moving a series of individual molds in an endless path to pass the molds in succession through a charging station adjacent said nozzle including the steps of moving the individual molds in one direction along an endless path to pass the molds in succession into the charging station from one side of the charging station and out of the charging station at the opposite side with the path passing through the charging station generally at right angles to the direction of extrusion from the nozzle for each of the molds in succession to receive at the charging station a length of continuously extruding tubing, continuously extruding tubing of softened organic plastic material from the nozzle, said continuous extrusion being accompanied by movement of the nozzle in the direction of extrusion of the material and toward each of the series of molds to be charged as successively disposed at the charging station while continuing to extrude tubing to introduce a length of tubing into each mold and movement of the nozzle away from each charged mold in the opposite direction from the extrusion of the material from the nozzle while continuing to extrude the tubing, severing the tubing between the nozzle and the mold disposed at the charging station to leave the severed end open and form a length of tubing from the continuously extruding tubing for each mold disposed at the charging station, closing in each mold the end of the length of tubing remote from the tubing end severed from the continuously extruding tubing while leaving the opposite end of the length of tubing open, and introducing blow molding air into the length of plastic material tubing in each individual mold through the tubing end severed from the continuously extruding tubing to expand such length of tubing into the configuration of the cavity of the mold.

2. In an apparatus for making hollow plastic articles, the combination comprising: a base having means providing a vertical axis rotatably mounting a mold carrier, a plurality of individual molds mounted on said carrier, drive means connected to rotate said carrier about said vertical axis and present said molds in succession at a charging station, a continuous extruder having an extruder nozzle mounted on the forward end thereof providing a continuously open passage to continuously extrude plastic material from said extruder in a direction generally parallel to said vertical axis, transmission means at the rear end of said extruder for driving the extruder, a mounting on said base having pivotal support means thereon providing a horizontal axis for pivotally supporting said extruder to dispose said extruder nozzle for swinging movement toward and away from the molds positioned in succession at said charging station, said extruder having pivot means adjacent the rear end thereof between said transmission means and said extruder nozzle cooperating with said pivotal support means, a support bracket mounted on and depending from adjacent the rear end of said extruder, a drive motor for said extruder mounted on said support bracket disposed beneath and forwardly of said horizontal axis, power transmitting means connecting said motor and said transmission means to continuously drive said extruder through said transmission means by said motor, actuating means connected between said extruder and said base to swing said extruder nozzle to a position for delivery of a length of material to the molds positioned in succession at said charging station and for moving said nozzle from said delivery position while uninterruptedly continuing the extrusion of hollow plastic material from said nozzle, means for severing a length of material as extruded from said nozzle while uninterruptedly continuing the extrusion of said material, means for blow molding the material in each mold, and control means for coordinating the rate of extrusion of said material and the movement of the nozzle by said actuating means with the presentation of said molds in succession at said charging station.

References Cited in the file of this patent

UNITED STATES PATENTS

| | | |
|---|---|---|
| 2,674,006 | Bailey et al. | Apr. 6, 1954 |
| 2,783,503 | Sherman | Mar. 5, 1957 |

FOREIGN PATENTS

| | | |
|---|---|---|
| 1,105,529 | France | July 6, 1955 |